(12) United States Patent
Daly

(10) Patent No.: US 10,462,201 B2
(45) Date of Patent: *Oct. 29, 2019

(54) WIRELESS CONTROL OF STREAMING COMPUTING DEVICE

(71) Applicant: Microsoft Technology Licensing, LLC, Redmond, WA (US)

(72) Inventor: Gregory M. Daly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/725,492

(22) Filed: Oct. 5, 2017

(65) Prior Publication Data

US 2018/0097860 A1    Apr. 5, 2018

Related U.S. Application Data

(63) Continuation of application No. 14/847,922, filed on Sep. 8, 2015, now Pat. No. 9,813,468.

(51) Int. Cl.
*H04L 29/06* (2006.01)
*H04L 12/26* (2006.01)
(Continued)

(52) U.S. Cl.
CPC ........ *H04L 65/4076* (2013.01); *A63F 13/235* (2014.09); *A63F 13/327* (2014.09);
(Continued)

(58) Field of Classification Search
CPC .................................................. H04L 65/4076
See application file for complete search history.

(56) References Cited

U.S. PATENT DOCUMENTS 6,684,062 B1   1/2004   Gosior et al.
7,412,542 B1   8/2008   Newson et al.
(Continued)

OTHER PUBLICATIONS

"Latency Kills", A Jibe Mobile White Paper, Feb. 18, 2014, 13 pages.
(Continued)

*Primary Examiner* — Albert T Chou
(74) *Attorney, Agent, or Firm* — International IP Law Group, PLLC

(57) ABSTRACT

The disclosed subject matter includes techniques for wireless control. A system includes a processor. The system also includes a computer-readable memory storage device storing executable instructions that can be executed by the processor to cause the processor to receive a connection request from a wireless controller. The processor can also send a request for a media stream and a request for a wireless monitoring acknowledgement to a host device. The processor can also receive a response from the host device with the wireless monitoring acknowledgment. The processor can also further receive a message from the host device acknowledging a reception with the wireless controller. The processor can stop monitoring for control data from the wireless controller in response to the host device acknowledging the reception with the wireless controller. The processor can further receive the media stream from the host device.

20 Claims, 9 Drawing Sheets

(51) Int. Cl.
*H04W 84/12* (2009.01)
*A63F 13/355* (2014.01)
*A63F 13/327* (2014.01)
*A63F 13/235* (2014.01)

(52) U.S. Cl.
CPC ............ *A63F 13/355* (2014.09); *H04L 43/10* (2013.01); *H04L 65/60* (2013.01); *H04W 84/12* (2013.01)

(56) References Cited

U.S. PATENT DOCUMENTS

| | | | |
|---|---|---|---|
| 8,130,742 | B2 | 3/2012 | Smith et al. |
| 8,187,095 | B2 | 5/2012 | Wong et al. |
| 8,556,721 | B2 | 10/2013 | Aronzon et al. |
| 8,990,446 | B2 | 3/2015 | Colenbrander |
| 9,813,468 | B2 * | 11/2017 | Daly .................. H04L 65/4076 |
| 2006/0154712 | A1 | 7/2006 | Lum et al. |
| 2006/0256819 | A1 | 11/2006 | Lum et al. |
| 2008/0199834 | A1 | 8/2008 | Taillefer et al. |
| 2008/0227548 | A1 | 9/2008 | Choudhry et al. |
| 2010/0113156 | A1 | 5/2010 | Yen |
| 2010/0203833 | A1 | 8/2010 | Dorsey |
| 2010/0317443 | A1 | 12/2010 | Cook et al. |
| 2014/0115631 | A1 | 4/2014 | Mak |
| 2014/0269755 | A1 | 9/2014 | Veiga |
| 2015/0217191 | A1 | 8/2015 | Yan |
| 2017/0034234 | A1 | 2/2017 | Zimring et al. |

OTHER PUBLICATIONS

"How do I Connect my XBOX to my Computer?", Published on: Jul. 7, 2014, Available at: hittp://www.computerhope.com/issues/ch001491.htm.

Harcsik, et al., "Latency Evaluation of Networking Mechanisms for Game Traffic", In Proceedings of the 6th ACM SIGCOMM workshop on Network and system support for games, Sep. 19, 2007, 6 pages.

Camps-Mur, et al.; "Device to device communications with WiFi Direct: overview and experimentation"; IEEE Wireless Communications, 2013, 8 pages.

Greenwald, Will, "How to Use Your Xbox or PS3 Controller on a PC", Published on: Mar. 23, 2012, Available at: http://www.pcmag.com/article2/0,2817,2400283,00.asp.

Mahardy, Mike, "XBOX Games may soon be Playable on PC", Published on: Sep. 12, 2014, Available at: hittp://www.ign.com/articles/2014/09/12/xbox-games-may-soon-be-streamed-on-pc.

International Search Report and the Written Opinion of the International Searching Authority, issued for PCT Application No. PCT/US2016/045451 dated Dec. 15, 2016, 20 pages.

Non-Final Office Action issued for U.S. Appl. No. 14/847,922, dated Mar. 1, 2017, 20 pages.

Notice of Allowance issued for U.S. Appl. No. 14/847,922, dated Jul. 5, 2017, 5 pages.

* cited by examiner

WIRELESS CONTROL OF STREAMING COMPUTING DEVICE

CROSS-REFERENCE TO RELATED APPLICATIONS

This application is a continuation of U.S. patent application Ser. No. 14/847,922, filed Sep. 8, 2015, and entitled "WIRELESS CONTROL OF STREAMING COMPUTING DEVICE", the application of which is incorporated herein in its entirety by reference.

BACKGROUND

Streaming devices can be used to interact with games that are rendered on more powerful host machines. For example, a control input from a controller can be processed by the target streaming device and routed through an (Internet Protocol) IP stack, either wired or wirelessly to the host machine. The host machine can render an appropriate response and stream video back to the target streaming device for display.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

An implementation provides for a system for wireless control. The system can include a processor and a computer-readable memory storage device storing executable instructions that can be executed by the processor to cause the processor to receive a connection request from a wireless controller. The example system can include executable instructions that can be executed by the processor to cause the processor to send a request for a media stream and a request for a wireless monitoring acknowledgement to a host device. The example system can also include executable instructions that can be executed by the processor to receive a response from the host device with the wireless monitoring acknowledgment. The example system can also include executable instructions that can be executed by the processor to receive a message from the host device acknowledging a reception with the wireless controller. The example system can also include executable instructions that can be executed by the processor to stop monitoring for control data from the wireless controller in response to the host device acknowledging the reception with the wireless controller. The example system can also include executable instructions that can be executed by the processor to receive the media stream from the host device.

Another implementation provides a system for wireless control. The system can include a processor and a computer-readable memory storage device storing executable instructions that can be executed by the processor to cause the processor to receive a request for a media stream and a request for a wireless monitoring acknowledgement from a target device. The system can also include executable instructions that can be executed by the processor to cause the processor to send a response to the target device with the wireless monitoring acknowledgment. The system can further include executable instructions that can be executed by the processor to cause the processor to monitor for a direct connection from the wireless controller via an accessory connection. The system can also further include executable instructions that can be executed by the processor to cause the processor to send a message to the target device acknowledging a reception of the direct connection with the wireless controller. The system can also further include executable instructions that can be executed by the processor to cause the processor to detect control data from the wireless controller via the accessory connection. The system can also further include executable instructions that can be executed by the processor to initiate the media stream with the target device in response to detecting the control data.

Another implementation provides for an apparatus for wireless control. The apparatus can include a processor and a computer-readable memory storage device storing executable instructions that can be executed by the processor to cause the processor to detect a beacon from a target device. The apparatus can further include executable instructions that can be executed by the processor to cause the processor to send a connection request to the target device. The apparatus can further include executable instructions that can be executed by the processor to cause the processor to monitor for a beacon from a host device. The apparatus can further include executable instructions that can be executed by the processor to cause the processor to establish a direct accessory connection with the host device in response to detecting the beacon from the host device. The apparatus can further include executable instructions that can be executed by the processor to cause the processor to send control data to the host device via the direct accessory connection.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

Figure 1:
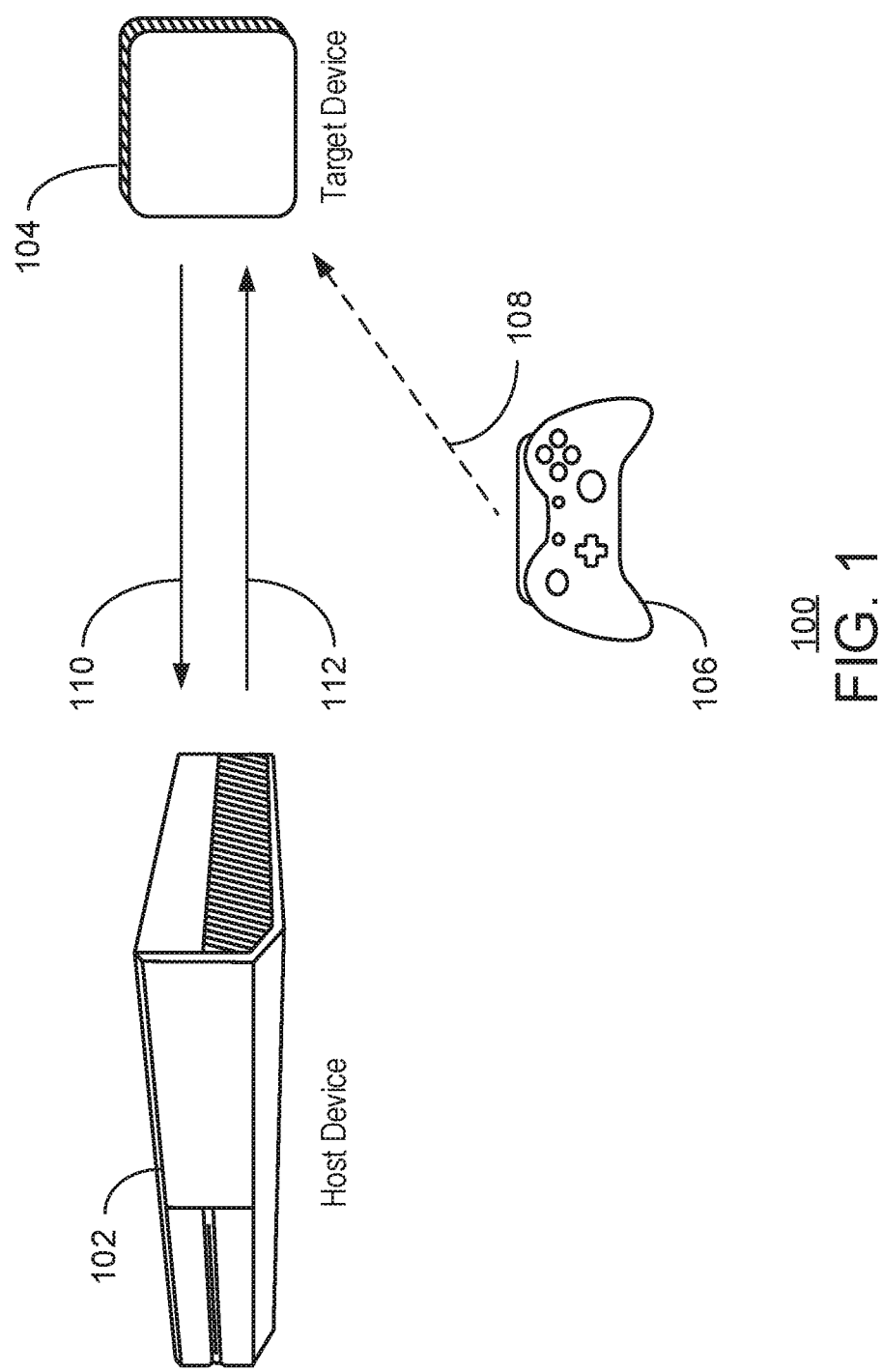
FIG. 1 is a block diagram of an example operating environment configured for implementing various aspects of the techniques described herein.

Streaming devices may use wired or wireless local area network connections to send controller data to a host machine and receive rendered streaming video corresponding to the controller data. However, the additional latency produced using the local area network connections may make the streaming device unsuitable for some applications. Moreover, the quality of user experience with fast-paced video games, such as racing games or first-person shooter games, may suffer greatly from the increased latency times.

This disclosure describes techniques for wireless control. In particular, a direct connection may be established between a wireless controller and a host device via an accessory connection. As used herein, an accessory connection refers to a wireless connection using an accessory radio to work with accessory devices. An accessory device, as used herein, refers to a wireless controller or any other suitable wireless input device. For example, a target device may receive a connection request from a wireless controller. A target device, as used herein, refers to any computing device receiving streamed media. In some examples, the target device can send a request for a media stream and a request for a wireless monitoring acknowledgement to a host device. A host device, as used herein, refers to any suitable computing device that can render media streams based on data input, such as control data from a controller. The host device can send a response to the target device with the wireless monitoring acknowledgment and monitor for a direct signal from a wireless controller via an accessory connection. The host device may then send a message to the target device acknowledging adequate reception or a lack of signal strength with the wireless controller. In some examples, if reception the host device and wireless controller is established then the wireless controller may send control data directly to the host device via the accessory connection. In some embodiments, if no signal is detected, then the target device may receive the control data from the wireless controller and rebroadcast the control data via a distinct logical controller to the host device via a second accessory connection. In some embodiments, if the second accessory connection cannot be established, then the target device can rebroadcast the control data via a local area network connection.

The techniques thus enable a wireless connection with reduced latency between two devices controlled by a wireless controller. For example, the techniques allow the devices to avoid the latency associated with using network connections to send control data from the controller via the target device to the host device. In addition, the techniques herein enable more flexible wireless configurations when a host device may be out of range of a wireless controller. For example, the control data may be repeated via an accessory connection of a target device to reach the host device if a direct connection cannot be established between the wireless controller and the host device. These techniques are described in more detail herein.

Figure 8:
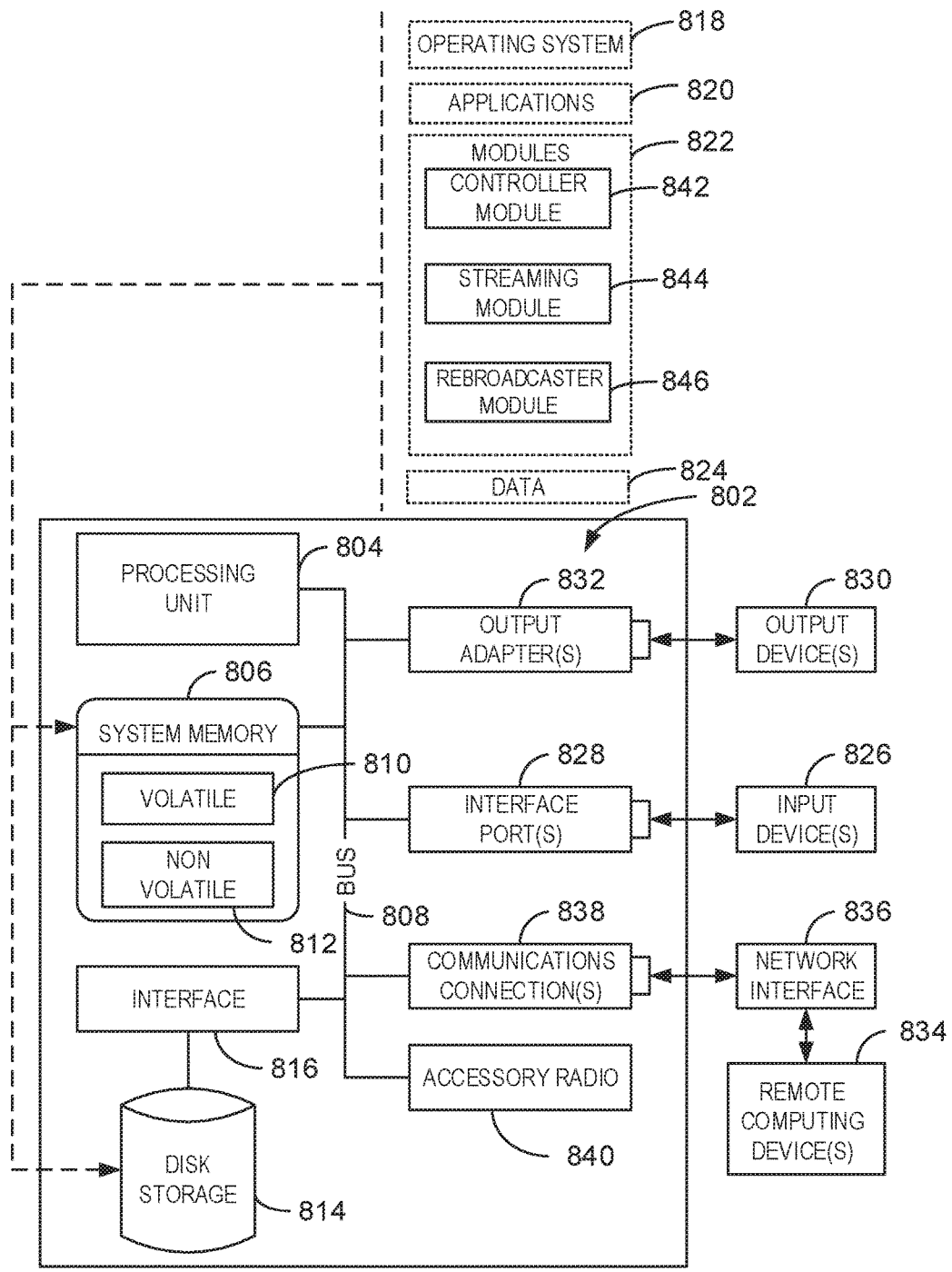
FIG. 8 is a block diagram of an example system for wireless control.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 8, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals.

FIG. 1 is a block diagram of an example operating environment configured for implementing various aspects of the techniques described herein. The example operating environment of FIG. 1 is referred to generally by the reference number 100.

The example operating environment 100 includes a host device 102, a target device 104, and a wireless controller 106. The wireless controller 106 is wirelessly coupled to the target device 104 via an accessory connection 108 as indicated by an arrow with a dotted line. The host device 102 and the target device 104 are coupled via local area network connections 110, 112 as shown by arrows with solid lines.

In the example operating environment 100, the wireless controller 106 may be turned on and can initiate a connection with the target device 104. For example, an end user may have turned on the wireless controller 106 in order to interact with a streaming video game via the target device 104 and may have pressed one or more buttons on the wireless controller 106 in order to initiate streaming of the video game. In some examples, the wireless controller 106 can detect a beacon from the target device 104 and send a connection request to the target device 104 in response to detecting the beacon. An accessory connection 108 may thus be established between the target device 104 and the accessory controller 106. In some examples, the controller may monitor for beacons from other devices, such as a host device 102. The wireless controller 106 can send data to the target device via the accessory connection 108. For example, the data may be control data or system data. Control data, as used herein, refers to data used to interact with a video game, application, or any other suitable software. System data, as used herein, refers to data used to interact with a graphical interface of the target device. In some examples, the target device 104 may receive system data and control data via the accessory connection 108. The target device 104 can send a request for a media stream and a request for a wireless monitoring acknowledgement to a host device via a local area network connection 110. For example, the media stream may correspond to updated frames of video from a video game in response to control data. The wireless monitoring acknowledgement, as used herein, refers to a response acknowledging the ability to monitor for direct wireless connections with a wireless controller. For example, the direct wireless connection may be an accessory connection. If the host device 102 is capable of establishing a direct wireless connection with the target device 104, then the host device 102 can send a response to the target device 104 with the wireless monitoring acknowledgement via the local area network connection 112.

In some examples, the host device 102 can then receive control data via the target device 104 or the wireless controller as discussed in greater detail with respect to FIGS. 2-4 below.

The diagram of FIG. 1 is not intended to indicate that the example operating environment 100 is to include all of the components shown in FIG. 1. Rather, the example operating environment 100 can include fewer or additional components not illustrated in FIG. 1 (e.g., additional controllers, target devices, host devices, etc.).

Figure 2:
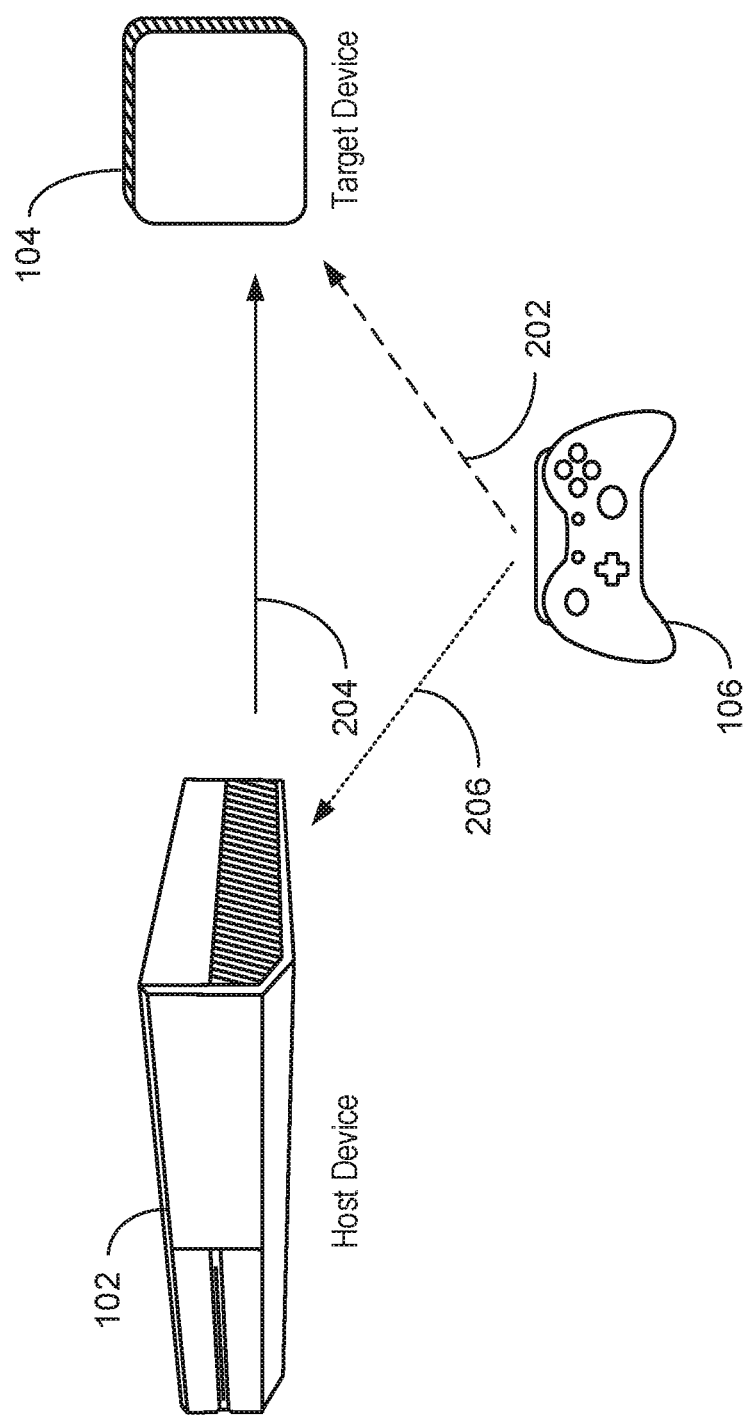
FIG. 2 is another block diagram of an example operating environment configured for implementing various aspects of the techniques described herein.

FIG. 2 is a block diagram of an example operating environment configured for implementing various aspects of the techniques described herein. The example operating environment of FIG. 2 is referred to generally by the reference number 200.

The example operating environment 200 also includes a host device 102, a target device 104, and a wireless controller 106. The wireless controller 106 is wirelessly coupled to the target device 104 via an accessory connection 202. The host device 102 is coupled to the target device 104 via a local area network connection 204, indicated by an arrow with a solid line. The host device 102 is also wirelessly coupled to the wireless controller 106 via an accessory connection 206, indicated by an arrow with a dotted line.

In the example operating environment 200, the host device 102 may have already sent a wireless monitoring acknowledgment to the target device 104. In some examples, the host device 102 can transmit beacons and begin to monitor for connection requests via the accessory connection 206 from the wireless controller 106. In some examples, the host device 102 can send a message to the target device 104 via local area network connection 204. For example, the message may be sent after a predetermined amount of time or in response to detecting a connection request from a wireless controller 106 via the accessory connection 206. If a connection request was detected, then the message may acknowledge successful reception with the wireless controller 106. If no connection request was detected, then the message may indicate a lack of reception with the wireless controller 106. In some examples, if the target device 104 receives a message indicating a lack of reception, then the target device 104 may begin to rebroadcast data from the wireless controller 106 as discussed in FIGS. 3 and 4.

The diagram of FIG. 2 is not intended to indicate that the example operating environment 200 is to include all of the components shown in FIG. 2. Rather, the example operating environment 200 can include fewer or additional components not illustrated in FIG. 2 (e.g., additional controllers, target devices, host devices, etc.).

Figure 3:
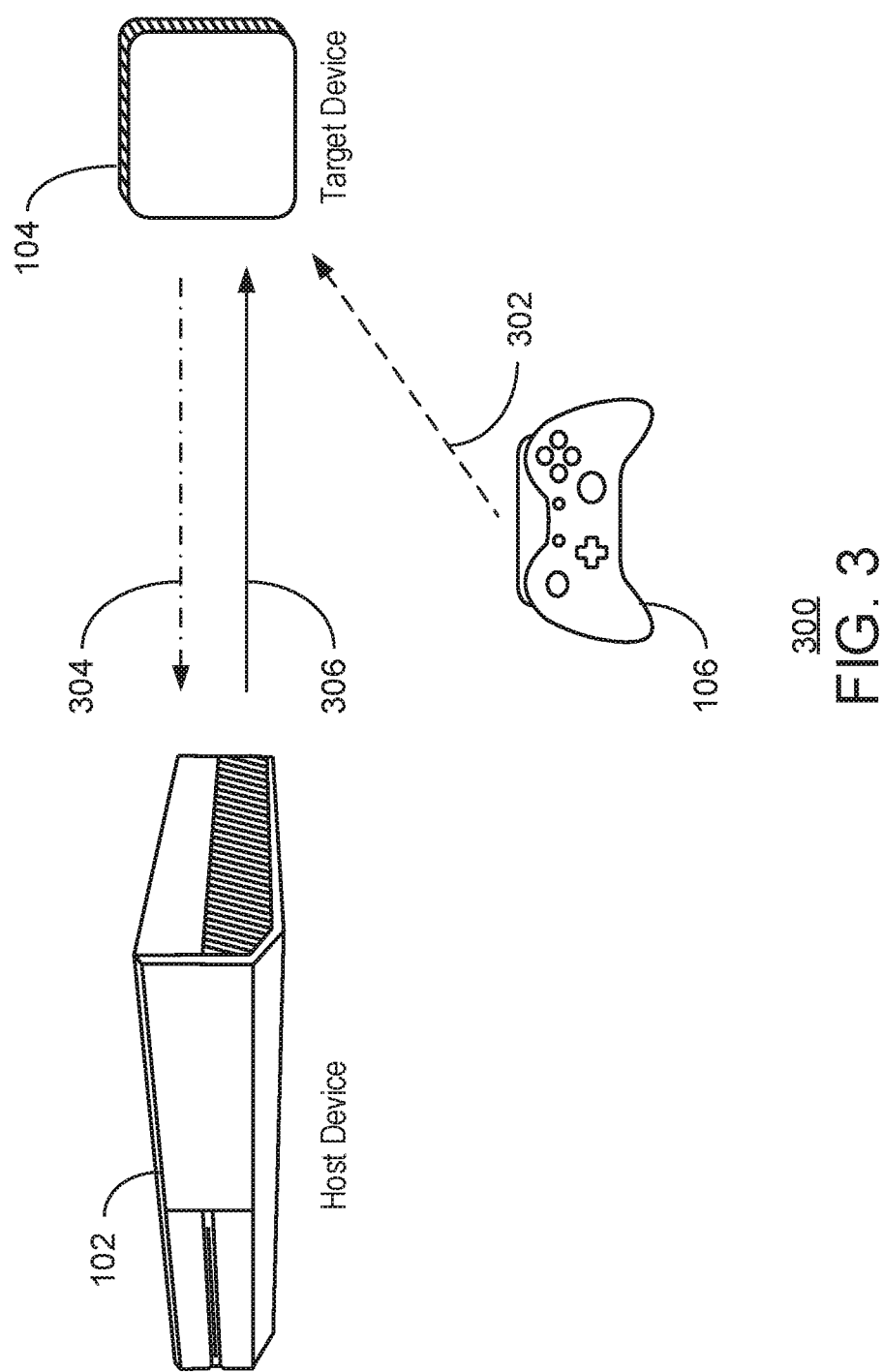
FIG. 3 is a block diagram of an example operating environment configured for implementing various aspects of the techniques described herein.

FIG. 3 is a block diagram of an example operating environment configured for implementing various aspects of the techniques described herein. The example operating environment of FIG. 3 is referred to generally by the reference number 300.

The example operating environment 300 also includes a host device 102, a target device 104, and a wireless controller 106. The wireless controller 106 is wirelessly coupled to the target device 104 via an accessory connection 302. The host device 102 is coupled to the target device 104 via an accessory connection 304, indicated by an arrow with a dotted line. The host device 102 is also coupled to the target device 104 via local area network connection 306, indicated by an arrow with a solid line.

In the example operating environment 300, the direct connection discussed in FIG. 2 above between the controller 106 and the host device 102 may have failed. For example, the host device 102 may be located outside the operable wireless range of the wireless controller 106. In some examples, interference may have caused the host device 102 to be unable to effectively communicate with wireless controller 106. For example, other wireless devices in proximity to the host device 102 and the controller 106 may be causing interference. In some examples, the host device 102 may never have been able to establish a connection with the wireless controller 106 and may have sent the target device 104 a message indicating a lack of reception with the wireless controller 106.

In some examples, the wireless controller 106 can send data to the target device 104 via an accessory connection 302. For example, the data can include control data and system data. The system data can be processed by the target device 104 and corresponding system menus can be displayed and/or modified by the wireless controller 106 accordingly. The control data can be rebroadcasted via another accessory connection 304 to the host device 102. For example, the control data can be rebroadcasted using a distinct logical controller via the accessory connection 304. In some examples, the host device 102 can send a message to the target device 104 via a local area network connection 306 indicating reception or lack of reception at the accessory connection 304. If a message indicating reception is received by the target device 104, then the target device 104 can send additional control data and receive rendered media stream from the host device 102 via the local area network connection 306. If a message indicating no reception is received by the target device 104, then the target device 104 can rebroadcast control data via a local area network connection as discussed in greater detail with respect to FIG. 4 below.

The diagram of FIG. 3 is not intended to indicate that the example operating environment 300 is to include all of the components shown in FIG. 3. Rather, the example operating environment 300 can include fewer or additional components not illustrated in FIG. 3 (e.g., additional controllers, target devices, host devices, etc.).

Figure 4:
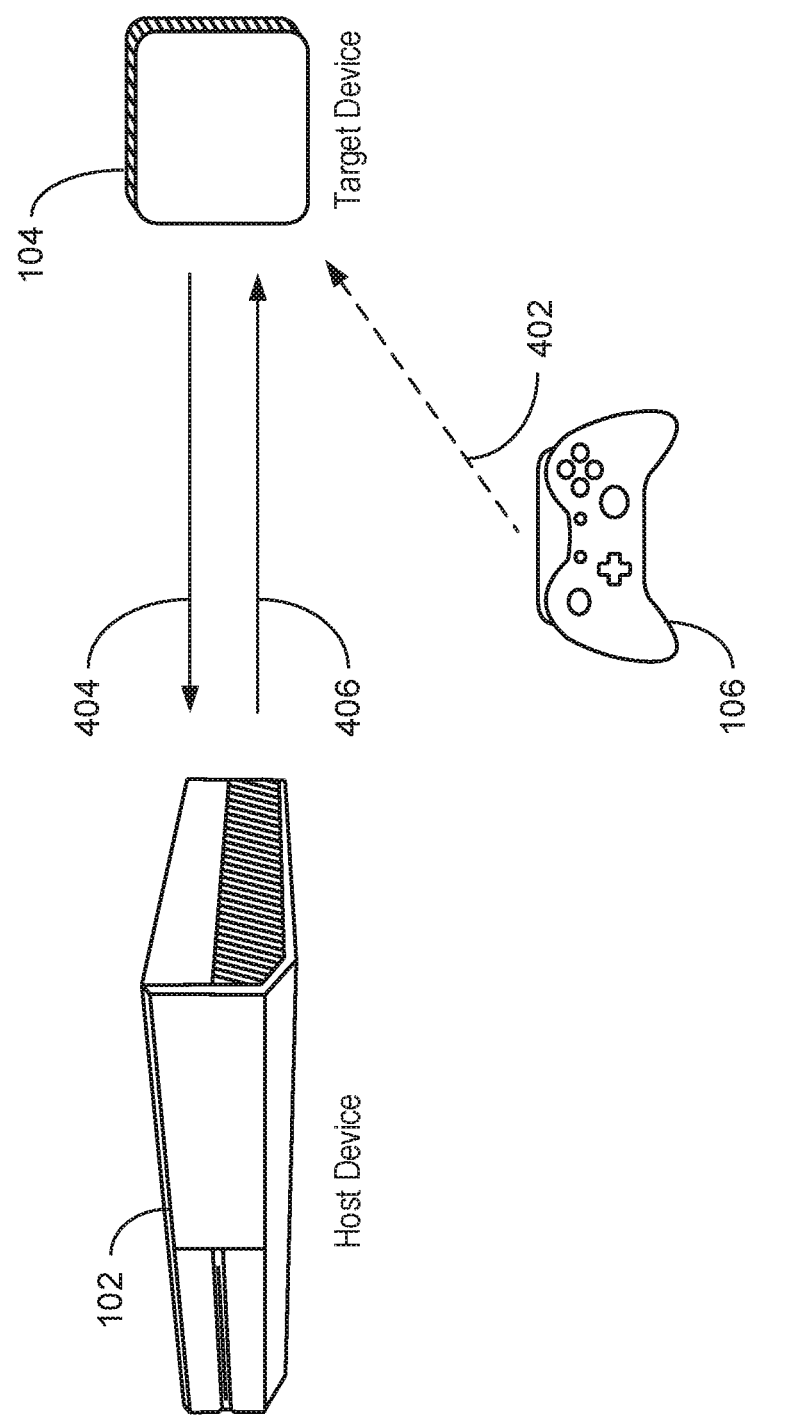
FIG. 4 is a block diagram of an example operating environment configured for implementing various aspects of the techniques described herein.

FIG. 4 is a block diagram of an example operating environment configured for implementing various aspects of the techniques described herein. The example operating environment of FIG. 4 is referred to generally by the reference number 400.

The example operating environment 400 also includes a host device 102, a target device 104, and a wireless controller 106. The wireless controller 106 is wirelessly coupled to the target device 104 via an accessory connection 402. The host device 102 is coupled to the target device 104 via a local area network connection 404, indicated by an arrow with a solid line. The host device 102 is also wirelessly coupled to the wireless controller 106 via accessory second local area network connection 406, indicated by an arrow with a solid line.

In the example operating environment 400, both the reception between the host device 102 and the wireless controller 106 at an accessory connection and the reception between the host device 102 and the target device 104 at an accessory connection may have failed. In some examples, the target device 104 may have received messages from the host device 102 indicating both a lack of reception with the wireless controller 106 via an accessory connection and a lack of reception with the target device 104 via an accessory connection. For example, the host device 102 may be located out of range of both the target device 104 and the wireless controller 106 and thus unable to establish a stable accessory connection with either device. In some examples, wireless interference may have caused both accessory connections between the host device 102 and the target device 104 and between the host device 102 and the wireless controller 106 to become unusable.

In the example of FIG. 4, the target device 104 may receive data including control data from the wireless controller via a usable accessory connection 402. In some examples, the target device 104 can rebroadcast control data to the host device 102 via a local area network connection 404. The host device 102 can then render a media stream based on the control data and send a rendered media stream to the target device 104 via a local area network connection 406.

The diagram of FIG. 4 is not intended to indicate that the example operating environment 400 is to include all of the components shown in FIG. 4. Rather, the example operating environment 400 can include fewer or additional components not illustrated in FIG. 4 (e.g., additional controllers, target devices, host devices, etc.).

Figure 5:
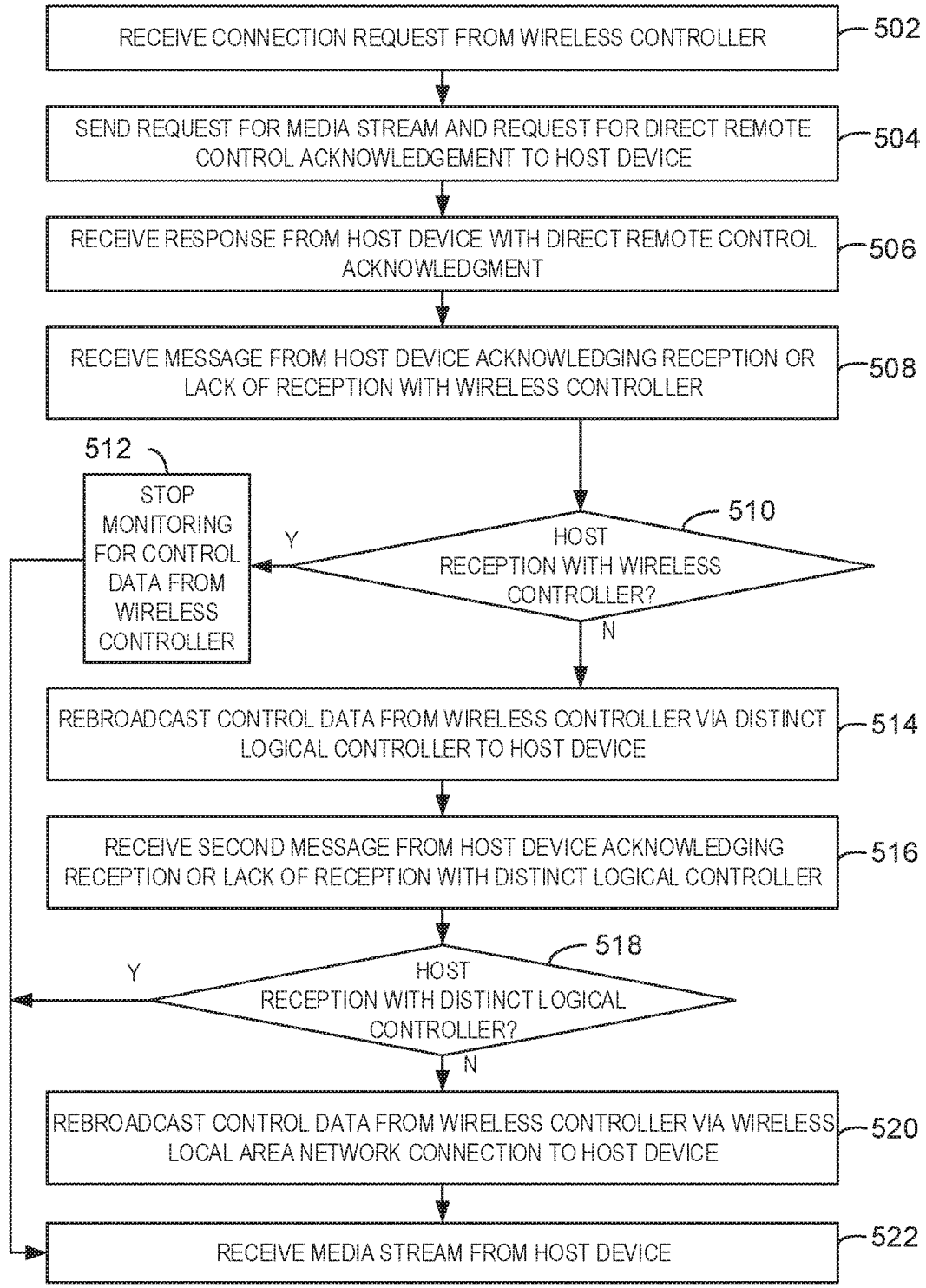
FIG. 5 is a process flow diagram of an example method for wireless control.

FIG. 5 shows a process flow diagram of an example method for wireless control. The example method is generally referred to by the reference number 500 and can be implemented using computer 802 as described below. The example method 500 can be performed by the target device 104 of FIGS. 1-4 above.

At block 502, the target device receives a connection request from the wireless controller. For example, the connection request may be received via an accessory connection with the wireless controller.

At block 504, the target device sends a request for a media stream and a request for a direct remote control acknowledgement to a host device. For example, the media stream may be rendered by the host device in response to control data from the wireless controller. The control data can be used to interact with a video game or application, for example. The direct remote control acknowledgment can indicate whether a host device is capable of establishing a direct connection via an accessory connection with one or more wireless controllers. In some examples, the request can be sent via a wired or wireless local area network connection.

At block 506, the target device receives a response from the host device with the direct remote control acknowledgment. For example, the response can be sent to the target device via the wired or wireless local area network connection.

At block 508, the target device receives a message from host device acknowledging reception or lack of reception with the wireless controller. For example, the message can indicate a reception of an accessory connection with the wireless controller at the host device.

At block 510, the target device determines whether there is host device reception with the wireless controller based on the received message. If the target device determines that there is host device reception with the wireless controller, then the method can proceed at block 520 below. If the target device determines that there is a lack of host device reception with the wireless controller, then the method can proceed at block 512 below.

At block 512, the target device stops monitoring for control data from the wireless controller. For example, the target device may stop monitoring for control data in response to the message from the host device acknowledging the reception with the wireless controller. In some example, the target device may again begin monitoring for control data in response to receiving a message acknowledging a lack of reception with the wireless controller.

At block 514, if the target device determines that there is a lack of host device reception with the wireless controller, the target device rebroadcasts control data from the wireless controller via a distinct logical controller to the host device. For example, the control data can correspond to input at the wireless controller that can be used to render the streaming video at the host device. In some examples, the distinct logical controller can operate via an accessory connection between the host device and the target device. For example, the target device may be closer to the host device than the wireless controller, or be able to generate and maintain a stronger accessory connection than the wireless controller.

At block 516, the target device receives a second message from the host device acknowledging a reception or a lack of reception with the distinct logical controller. For example, the second message may be sent via a wired or wireless local area network connection.

At block 518, the target device determines whether there is host device reception with the distinct logical controller based on the second message. If the target device determines that there is host device reception with the distinct logical controller, then the method may proceed at block 522. If the target device determines that there is a lack host device reception with the distinct logical controller, then the method may proceed at block 520.

At block 520, if the target device determines that there is a lack host device reception with the distinct logical controller, then the target device rebroadcasts control data from the wireless controller to the host device via a wireless local area network connection. For example, the wireless local area network connection can be a wired or a wireless connection using the Transmission Control Protocol/Internet Protocol (TCP/IP).

At block 522, the target device receives a media stream from the host device. For example, the media stream can be a rendered media stream from a video game or an application being run on the host device. In some examples, the media stream can be received at the target device via a local area network connection. For example, the local area network connection can be wired or wireless and use TCP/IP.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included. For example, the target device can select a connection to send control data based on latency and reliability. For example, if the reliability of the accessory connection between the host device and the controller as described in block 510 does not exceed a threshold, then the target device can send control data to the host device as described at blocks 514 or 520 above. Further, any number of additional steps may be included within the method 500, depending on the specific application.

Figure 6:
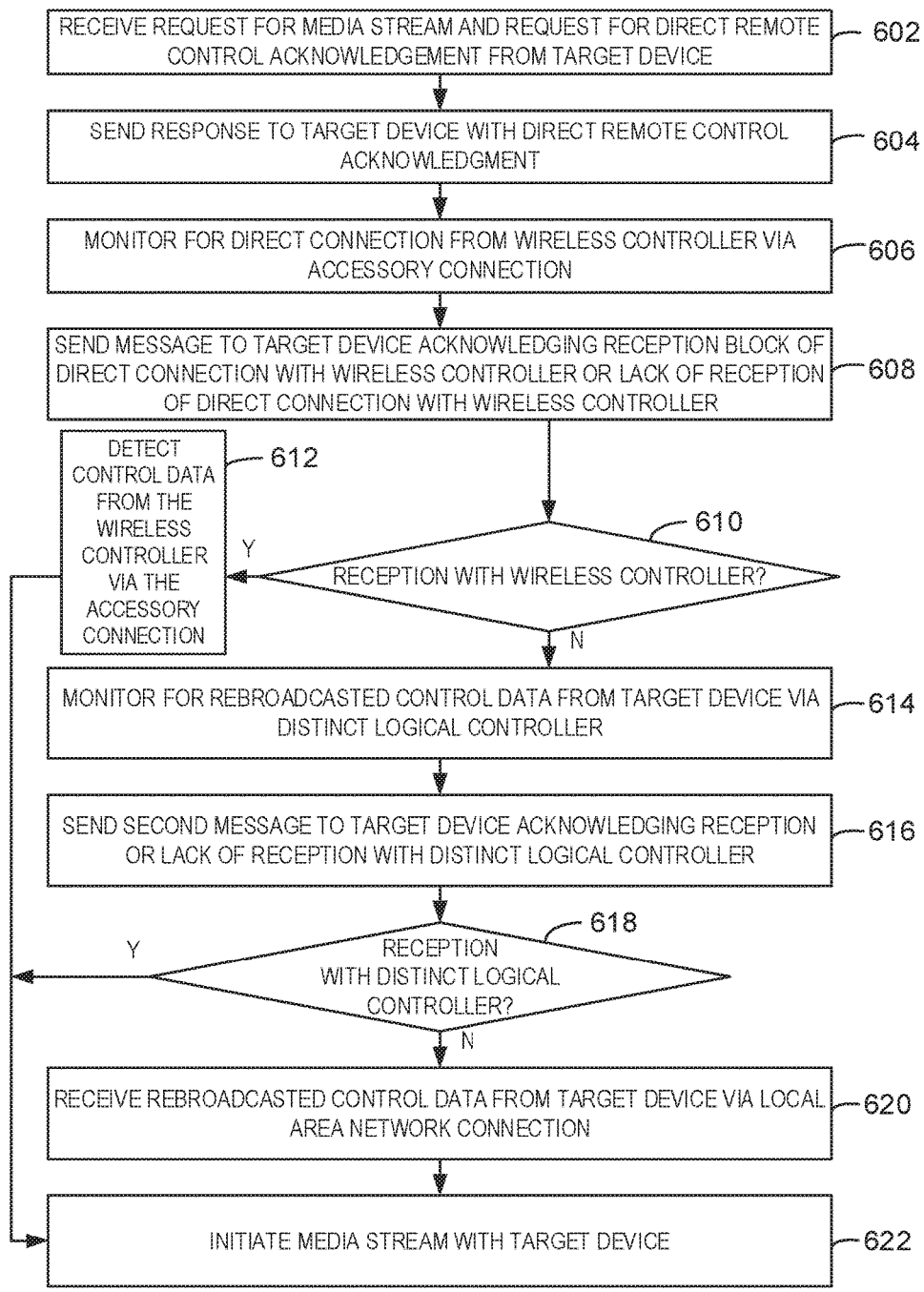
FIG. 6 is a process flow diagram of another example method for wireless control.

FIG. 6 shows a process flow diagram of an example method for wireless control. The example method is generally referred to by the reference number 600 and can be implemented using computer 802 as described below. The example method 600 can be performed by the host device of FIGS. 1-4 above.

At block 602, the host device receives a request for a media stream and a request for a direct remote control acknowledgement from the target device. For example, the media stream may correspond to a video game or application running on the host device. The host device may render the media stream based on control data from a wireless controller. For example, the control data may be received from the wireless controller at the host device via a direct accessory connection or via a rebroadcasted connection with the target device as discussed below.

At block 604, the host device sends a response to target device with the direct remote control acknowledgment. For example, the response can be sent to the target device via a wired or wireless local area network connection. The direct remote control acknowledgment can include an indication of an ability to connect via an accessory connection with one or more wireless controllers.

At block 606, the host device monitors for a direct connection from the wireless controller via an accessory connection in response to the request for direct remote control acknowledgement. For example, the host device may monitor an accessory radio for a connection request from one or more wireless controllers.

At block 608, the host device sends a message to the target device acknowledging a reception of a direct connection with the wireless controller or lack of reception of a direct connection with the wireless controller. For example, the message can indicate that an accessory connection with the wireless controller has been established at the host device.

At block 610, the host device determines whether there is reception with the wireless controller. If the host device determines that there is reception with the wireless controller, then the method may proceed at block 620. If the host device determines that there is a lack of reception with the wireless controller, then the method may proceed at block 612.

At block 612, the host device detects control data from the wireless controller via the accessory connection. For example, the control data can be used by the host device to render streaming video as described below in block 622.

At block 614, if the host device determines that there is a lack of reception with the wireless controller, then the host device monitors for rebroadcasted control data from the target device via a distinct logical controller. For example, the distinct logical controller may be detected via a wireless accessory connection.

At block 616, the host device sends a second message to the target device acknowledging reception or a lack of reception with the distinct logical controller of the target device. For example, the message can indicate a reception or lack or reception of an accessory connection with the target device at the host device. In some examples, the second message can be sent via a wired or wireless local area network connection. In some examples, the second message can be sent via the accessory connection.

At block 618, the host device determines whether there is reception with the distinct logical controller. If the host device determines that there is reception with the distinct logical controller, then the method may proceed at block 622. If the host device determines that there is a lack of reception with the distinct logical controller, then the method may proceed at block 620.

At block 620, if the host device determines that there is no reception with the distinct logical controller of the target device, then the host device can receive rebroadcasted control data from the target device via a local area network connection. For example, the local area network connection can be a wired or wireless local area network connection that uses TCP/IP.

At block 622, the host device initiates a media stream with the target device. For example, the media stream can be a media stream rendered using the control data on the host device by a video game or an application running on the host device. In some examples, the media stream can be sent to the target device via a local area network connection. For example, the local area network connection can be wired or wireless and may use TCP/IP.

In one embodiment, the process flow diagram of FIG. 6 is intended to indicate that the steps of the method 600 are to be executed in a particular order. Alternatively, in other embodiments, the steps of the method 600 can be executed in any suitable order and any suitable number of the steps of the method 600 can be included. Further, any number of additional steps may be included within the method 600, depending on the specific application.

Figure 7:
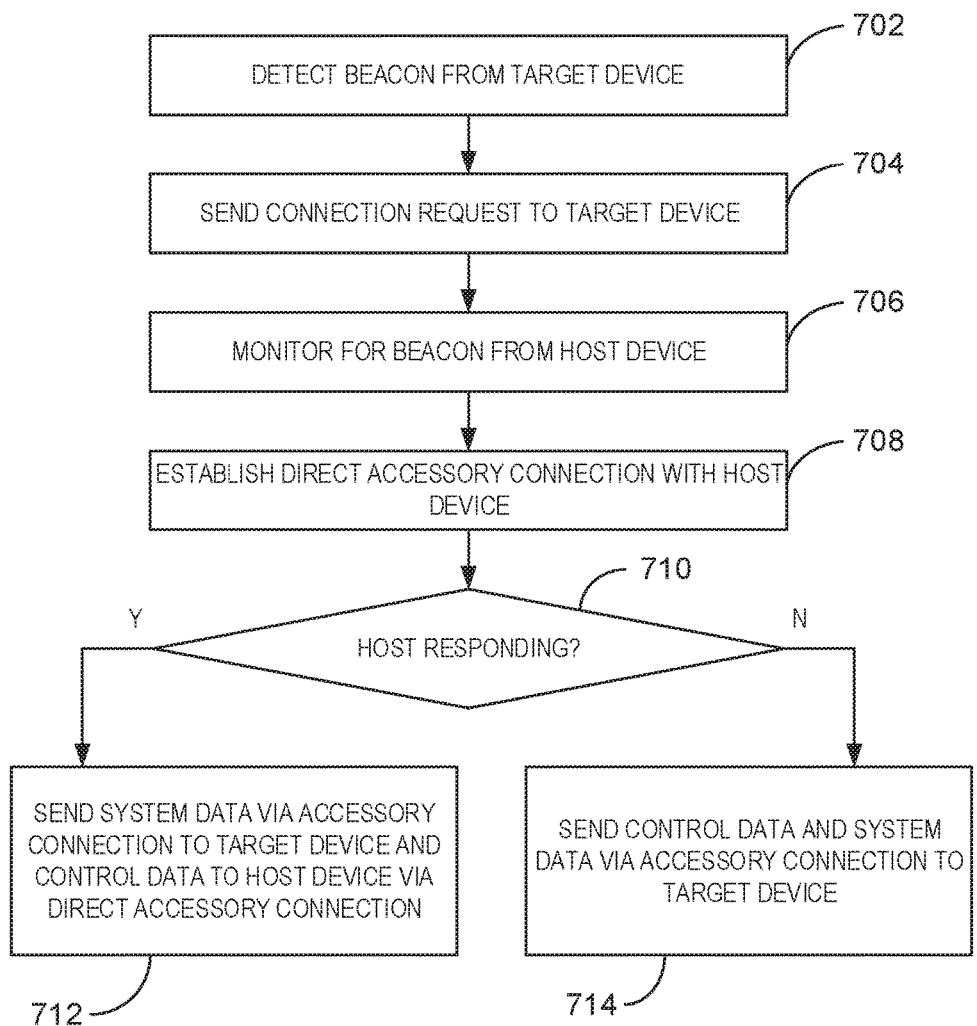
FIG. 7 is a process flow diagram of an additional example method for wireless control.

FIG. 7 shows a process flow diagram of an example method for wireless control. The example method is generally referred to by the reference number 700 and can be implemented using computer 802 as described below. The example method 700 can be performed by the wireless controller 106 of FIGS. 1-4 above.

At block 702, the wireless controller detects a beacon from a target device. For example, the beacon can include information about the accessory connection with the target device such as a beacon interval, a timestamp, a service set identifier (SSID), supported rates, and parameter sets. The beacon interval can represent the amount of time between beacon transmissions. The timestamp can be used to update local clocks and synchronize time across devices. The SSID can be used to identify and connect with the target device by setting an identical SSID or any other suitable SSID at the wireless controller. The parameter sets can include information about the specific signaling methods. For example, a parameter set can include the channel number that the target device is using to transmit data.

At block 704, the wireless controller sends a connection request to the target device. For example, the connection request can contain information such as a network key and the like.

At block 706, the wireless controller monitors for a beacon from a host device. For example, the beacon may be detected via a wireless accessory connection. The beacon can include information about the accessory connection with the host device such as a beacon interval, a timestamp, a service set identifier (SSID), supported rates, and parameter sets.

At block 708, the wireless controller can establish a direct accessory connection with the host device. For example, the direct accessory connection can be a direct wireless connection between the wireless controller and the host device.

At block 710, the wireless controller determines whether the host device is responding. If the wireless controller determines that the host device is responding, then the method may proceed at block 712. If the wireless controller determines that the host device is not responding, then the method may proceed at block 714.

At block 712, if the wireless controller determines that the host device is responding, the wireless controller sends system data via an accessory connection to the target device and control data to the host device via a direct accessory connection. For example, system data can be used by the target device to control a user interface on the target device. In some examples, the wireless controller may include one or more buttons associated with the system data. For example, system data may be generated by pressing one or more of the buttons. The control data can be used to render a media stream on the host device.

At block 714, if the wireless controller determines that the host device is not responding, the wireless controller sends control data and system data via an accessory connection to the target device. For example, the system data can be used by the target device to control a user interface on the target device. In some examples, the control data can be rebroadcasted by the target device to the host device as discussed in greater detail with respect to FIG. 5 above. In some examples, the wireless controller can determine wireless channels for the accessory connections based on latency. For example, a wireless channel with less interference may be used instead of a wireless channel with more interference.

In one embodiment, the process flow diagram of FIG. 7 is intended to indicate that the steps of the method 700 are to be executed in a particular order. Alternatively, in other embodiments, the steps of the method 700 can be executed in any suitable order and any suitable number of the steps of the method 700 can be included. Further, any number of additional steps may be included within the method 700, depending on the specific application. For example, in some embodiments, the wireless controller can select an accessory connection to send the control data based on latency, reliability, or both. For example, the wireless controller can select the accessory connection that has a lower latency between the host device and the target device. In some examples, the wireless controller can be trained to multiple devices, with a subset of functions present on the target device. For example, the wireless controller may be trained to connect with multiple host devices via a plurality of accessory connections. The subset of functions on the target device may be controlled via system data sent directly to the target device via another accessory connection.

FIG. 8 is a block diagram of an example system for wireless control. The example system 800 includes a computer 802. The computer 802 includes a processing unit 804, a system memory 806, and a system bus 808. For example, the computer 802 may be the host device 102 or the target device 104 of FIGS. 1-4 above. In some examples, the computer 802 can be a gaming console, a PC, or an accessory console.

The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure, including the memory bus or memory controller, a peripheral bus or external bus, and a local bus using any variety of available bus architectures known to those of ordinary skill in the art. The system memory 806 includes computer-readable storage media that includes volatile memory 810 and nonvolatile memory 812.

The basic input/output system (BIOS), containing the basic routines to transfer information between elements within the computer 802, such as during start-up, is stored in nonvolatile memory 812. By way of illustration, and not limitation, nonvolatile memory 812 can include read-only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 802 also includes other computer-readable media, such as removable/non-removable, volatile/non-volatile computer storage media. FIG. 8 shows, for example a disk storage 814. Disk storage 814 includes, but is not limited to, devices like a magnetic disk drive, floppy disk drive, tape drive, Jaz drive, Zip drive, LS-210 drive, flash memory card, or memory stick.

In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer 802.

System applications 820 take advantage of the management of resources by operating system 818 through program modules 822 and program data 824 stored either in system memory 806 or on disk storage 814. It is to be appreciated that the disclosed subject matter can be implemented with various operating systems or combinations of operating systems.

A user enters commands or information into the computer 802 through input devices 826. Input devices 826 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. For example, the slave device 104 of FIG. 1 may be an input device 826. The input devices 826 connect to the processing unit 804 through the system bus 808 via interface ports 828. Interface ports 828 include, for example, a serial port, a parallel port, a game port, and a universal serial bus (USB).

Output devices 830 use some of the same type of ports as input devices 826. Thus, for example, a USB port may be used to provide input to the computer 802, and to output information from computer 802 to an output device 830.

Output adapter 832 is provided to illustrate that there are some output devices 830 like monitors, speakers, and printers, among other output devices 830, which are accessible via adapters. The output adapters 832 include, by way of illustration and not limitation, video and sound cards that provide a means of connection between the output device 830 and the system bus 808. It can be noted that other devices and systems of devices provide both input and output capabilities such as remote computing devices 834.

The computer 802 can be a server hosting various software applications in a networked environment using logical connections to one or more remote computers, such as remote computing devices 834. The remote computing devices 834 may be client systems configured with web browsers, PC applications, mobile phone applications, and the like. The remote computing devices 834 can be a personal computer, a server, a router, a network PC, a workstation, a microprocessor based appliance, a mobile phone, a peer device or other common network node and the like, and typically includes many or all of the elements described relative to the computer 802.

Remote computing devices 834 can be logically connected to the computer 802 through a network interface 836 and then connected via a communication connection 838, which may be wireless. Network interface 836 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 838 refers to the hardware/software employed to connect the network interface 836 to the bus 808. While communication connection 838 is shown for illustrative clarity inside computer 802, it can also be external to the computer 802. The hardware/software for connection to the network interface 836 may include, for exemplary purposes, internal and external technologies such as, mobile phone switches, modems including regular telephone grade modems, cable modems and DSL modems, ISDN adapters, and Ethernet cards.

The computer 802 can further include an accessory radio 840. For example, the accessory radio 840 can operate on any suitable band.

An example processing unit 804 for the server may be a computing cluster. Additionally, the disk storage 814 can store various types of data 824 used to stream video. For example, the disk storage 814 may be an enterprise data storage system, for example, storing data 824 such as control data and system data.

The computer 802 includes one or more modules 822 configured to enable wireless control of a streaming computing device, including a controller module 842, a streaming module 844, and a rebroadcaster module 846. The controller module 842 can receive a connection request from a wireless controller. For example, the connection request can be received via an accessory connection at the accessory radio 840. The streaming module 844 can send a request for a media stream and a request for a wireless monitoring acknowledgement to a host device. In some examples, the wireless monitoring acknowledgement indicates a direct wireless connection between the host device and the wireless controller. For example, the direct wireless connection can be via a wireless accessory connection. The streaming module 844 can also receive a response from the host device with the wireless monitoring acknowledgment. For example, the response may indicate that the host device is able to monitor wireless accessory connections for control data. The streaming module 844 can further receive a message from the host device acknowledging a reception or a lack of reception with the wireless controller. The host device can receive control data from the wireless controller via a direct accessory connection based on the reception with the wireless controller. For example, if the host device detects reception with the wireless controller via the direct accessory connection, then the host device can send a message to the controller module 842 and receive control data directly from the wireless controller. The streaming module 844 can receive the media stream from the host device if the message is received acknowledging the reception with the wireless controller.

In some examples, the rebroadcaster module 846 can receive control data from the wireless controller if the controller module 842 detects a message from the host device indicating a lack of reception with the wireless controller. For example, the host device may be out of range of the wireless controller or may be experiencing wireless interference. In some examples, the rebroadcaster module 846 can rebroadcast control data from the wireless controller via a distinct logical controller to the host device if the message is received acknowledging the lack of reception with the wireless controller. The streaming module 844 can then receive a second message from the host device acknowledging a reception or a lack of reception with the distinct logical controller. The streaming module 844 can also receive the media stream from the host device. In some examples, the controller module 842 can receive a system command from the wireless controller and display the system command at a graphical user interface. For example, the graphical user interface can be a menu on a display such as a television or a monitor.

In some examples, the rebroadcaster module 846 rebroadcast the control data from the wireless controller via a wireless local area network connection to the host device if the second message is received acknowledging the lack of reception with the distinct logical controller.

It is to be understood that the block diagram of FIG. 8 is not intended to indicate that the computing system 800 is to include all of the components shown in FIG. 8. Rather, the computing system 800 can include fewer or additional components not illustrated in FIG. 8 (e.g., additional applications, additional modules, additional memory devices, additional network interfaces, additional MACs, etc.). Furthermore, any of the functionalities of the energy profile module 840 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 9:
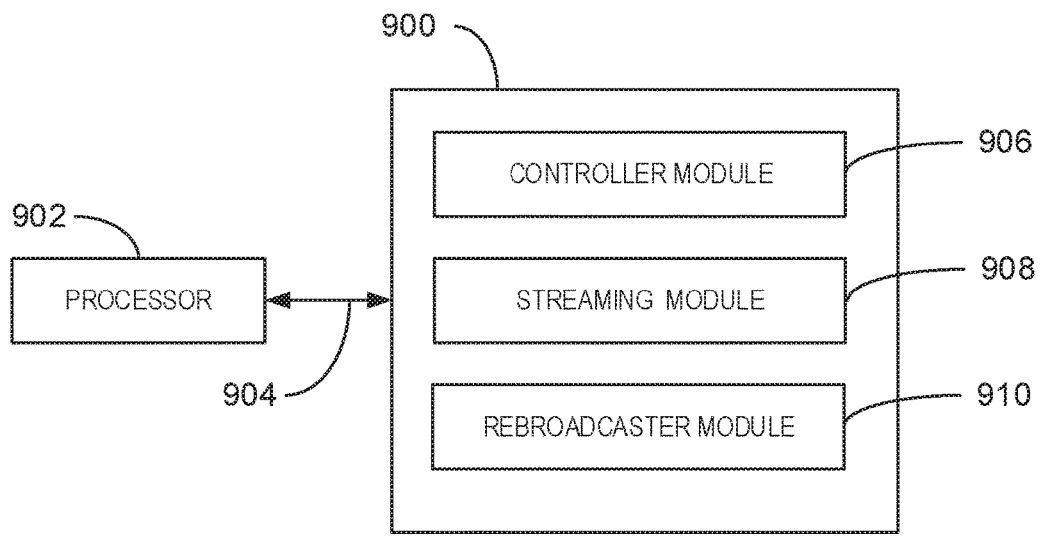
FIG. 9 is a block diagram showing an example tangible, computer-readable storage medium that can be used for wireless control of a streaming device.

FIG. 9 is a block diagram showing an example tangible, computer-readable storage medium that can be used for wireless control of a streaming device. The tangible, computer-readable storage media 900 can be accessed by a processor 902 over a computer bus 904. Furthermore, the tangible, computer-readable storage media 900 can include code to direct the processor 902 to perform the current methods.

The various software components discussed herein can be stored on the tangible, computer-readable storage media 900, as indicated in FIG. 9. For example, the tangible computer-readable storage media 900 can include a controller module 906, a streaming module 908, and a rebroadcaster module 910. In some implementations, the controller module 906 can include code to receive a connection request from a wireless controller. For example, the connection request may be received via an accessory connection. The streaming module 908 can also include code to send a request for a media stream and a request for a wireless monitoring acknowledgement to a host device. For example, the wireless monitoring acknowledgement can indicate a reception or lack of reception with a direct wireless connection between the host device and the wireless controller. The streaming module 908 can include code to receive a response from the host device with the wireless monitoring acknowledgment. The streaming module 908 can also include code to receive a message from the host device acknowledging a reception or a lack of reception with the wireless controller. The host device may receive control data from the wireless controller via a direct accessory connection based on the reception with the wireless controller. In some examples, the streaming module 908 can include code to receive the media stream from the host device if the message is received acknowledging the reception with the wireless controller.

In some examples, the rebroadcaster module 910 may include code to rebroadcast control data from the wireless controller via a distinct logical controller to the host device if the message is received acknowledging the lack of reception with the wireless controller and receive a second message from the host device acknowledging a reception or a lack of reception with the distinct logical controller. The streaming module 908 can include code to receive the media stream from the host device if the second message is received acknowledging the reception with the distinct logical controller. In some examples, the rebroadcaster module 910 can include code to rebroadcast the control data from the wireless controller via a wireless local area network connection to the host device if the second message is received acknowledging the lack of reception with the distinct logical controller. The streaming module 908 can include code to receive the media stream from the host device. In some examples, the controller module 906 can include code to receive a system command from the wireless controller and display the system command. For example, the system command may be displayed via a graphical user interface.

It is to be understood that any number of additional software components not shown in FIG. 9 can be included within the tangible, computer-readable storage media 900, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for wireless control. The example system includes a processor; and a computer-readable memory storage device storing executable instructions that can be executed by the processor to cause the processor to receive a connection request from a wireless controller. The example system also includes executable instructions that can be executed by the processor to cause the processor to send a request for a media stream and a request for a wireless monitoring acknowledgement to a host device. The example system also includes executable instructions that can be executed by the processor to cause the processor to receive a response from the host device with the wireless monitoring acknowledgment. The example system also includes executable instructions that can be executed by the processor to cause the processor to receive a message from the host device acknowledging a reception with the wireless controller. The example system also includes executable instructions that can be executed by the processor to cause the processor to stop monitoring for control data from the wireless controller in response to the host device acknowledging the reception with the wireless controller. The example system also includes executable instructions that can be executed by the processor to cause the processor to receive the media stream from the host device. Alternatively, or in addition, the media stream is to be rendered based on control data received by the host device from the wireless controller via a direct accessory connection. Alternatively, or in addition, the example system can include executable instructions that can be executed by the processor to further rebroadcast control data from the wireless controller via a distinct logical controller to the host device in response to receiving the message acknowledging the lack of reception with the wireless controller. Alternatively, or in addition, the example system can include executable instructions that can be executed by the processor to further receive a second message from the host device acknowledging a reception or a lack of reception with the distinct logical controller. Alternatively, or in addition, the example system can include executable instructions that can be executed by the processor to further receive the media stream from the host device in response to receiving the second message acknowledging the reception with the distinct logical controller. Alternatively, or in addition, the example system can include executable instructions that can be executed by the processor to further rebroadcast the control data from the wireless controller via a wireless local area network connection to the host device in response to receiving the second message acknowledging the lack of reception with the distinct logical controller. Alternatively, or in addition, the example system can include executable instructions that can be executed by the processor to further receive the media stream from the host device. Alternatively, or in addition, the wireless monitoring acknowledgement indicates a direct wireless connection between the host device and the wireless controller. Alternatively, or in addition, the example system can include executable instructions that can be executed by the processor to further receive a system command from the wireless controller, the system command comprising instructions to be displayed.

Example 2

This example provides for an example method for wireless control. The example method includes receiving, via a processor, a connection request from a wireless controller. The example method includes sending, via the processor, a request for a media stream and a request for a wireless monitoring acknowledgement to a host device. The example method also includes receiving, via the processor, a response from the host device with the wireless monitoring acknowledgment. The example method also includes receiving, via the processor, a message from the host device acknowledging a reception with the wireless controller. The example method also includes stopping, via the processor, monitoring for control data from the wireless controller in response to the host device acknowledging the reception with the wireless controller. The example method also includes receiving, via the processor, the media stream from the host device. Alternatively, or in addition, the example method may include rendering the media stream based on control data received by the host device from the wireless controller via a direct accessory connection. Alternatively, or in addition, the example method may include rebroadcasting, via the processor, control data from the wireless controller via a distinct logical controller to the host device in response to receiving the message acknowledging the lack of reception with the wireless controller. Alternatively, or in addition, the example method may include receiving, via the processor, a second message from the host device acknowledging a reception or a lack of reception with the distinct logical controller. Alternatively, or in addition, the example method may include receiving, via the processor, the media stream from the host device in response to receiving the second message acknowledging the reception with the distinct logical controller. Alternatively, or in addition, the example method may include rebroadcasting, via the processor, the control data from the wireless controller via a wireless local area network connection to the host device in response to receiving the second message acknowledging the lack of reception with the distinct logical controller. Alternatively, or in addition, the example method may include receiving, via the processor, the media stream from the host device. Alternatively, or in addition, the wireless monitoring acknowledgement can indicate a direct wireless connection between the host device and the wireless controller. Alternatively, or in addition, the example method may include receiving, via the processor, a system command from the wireless controller, the system command comprising instructions to be displayed.

Example 3

This example provides for an example one or more computer-readable memory storage devices for storing computer readable instructions that, when executed by one or more processing devices, instruct wireless control of a streaming device. The computer-readable instructions may include code to receive a connection request from a wireless controller. The computer-readable instructions may include code to send a request for a media stream and a request for a wireless monitoring acknowledgement to a host device. The computer-readable instructions may include code to receive a response from the host device with the wireless monitoring acknowledgment. The computer-readable instructions may include code to receive a message from the host device acknowledging a reception with the wireless controller. The computer-readable instructions may include code to stop monitoring for control data from the wireless controller in response to the host device acknowledging the reception with the wireless controller. The computer-readable instructions may include code to receive the media stream from the host device. Alternatively, or in addition, the computer-readable instructions may include code to render the media stream based on control data received by the host device from the wireless controller via a direct accessory connection. Alternatively, or in addition, the computer-readable instructions may include code to rebroadcast control data from the wireless controller via a distinct logical controller to the host device in response to receiving the message acknowledging the lack of reception with the wireless controller. Alternatively, or in addition, the computer-readable instructions may include code to receive a second message from the host device acknowledging a reception or a lack of reception with the distinct logical controller. Alternatively, or in addition, the computer-readable instructions may include code to receive the media stream from the host device in response to receiving the second message acknowledging the reception with the distinct logical controller. Alternatively, or in addition, the computer-readable instructions may include code to rebroadcast the control data from the wireless controller via a wireless local area network connection to the host device in response to receiving the second message acknowledging the lack of reception with the distinct logical controller. Alternatively, or in addition, the computer-readable instructions may include code to receive the media stream from the host device. Alternatively, or in addition, the wireless monitoring acknowledgement indicates a direct wireless connection between the host device and the wireless controller. Alternatively, or in addition, the computer-readable instructions may include code to receive a system command from the wireless controller, the system command comprising instructions to be displayed.

Example 4

This example provides for an example system for wireless control. The example system includes a processor; and a computer-readable memory storage device storing executable instructions that can be executed by the processor to cause the processor to receive a request for a media stream and a request for a wireless monitoring acknowledgement from a target device. The example system also includes executable instructions that can be executed by the processor to send a response to the target device with the wireless monitoring acknowledgment. The example system also includes executable instructions that can be executed by the processor to monitor for a direct connection from the wireless controller via an accessory connection. The example system also includes executable instructions that can be executed by the processor to send a message to the target device acknowledging a reception of the direct connection with the wireless controller. The example system also includes executable instructions that can be executed by the processor to detect control data from the wireless controller via the accessory connection. The example system also includes executable instructions that can be executed by the processor to initiate the media stream with the target device in response to detecting the control data. Alternatively, or in addition, the processor is to render the media stream based on the control data from the wireless controller. Alternatively, or in addition, the processor is to further receive rebroadcasted control data from the target device via a distinct logical controller in response to detecting the lack of reception of the direct connection with the wireless controller. Alternatively, or in addition, the processor is to further send a second message to the target device acknowledging a reception with the distinct logical controller or a lack of reception with the distinct logical controller. Alternatively, or in addition, the processor is to further initiate the media stream in response to detecting the reception with the distinct logical controller. Alternatively, or in addition, the processor is to further receive rebroadcasted control data from the target device via a wireless local area network connection in response to detecting the lack of reception with the distinct logical controller. Alternatively, or in addition, the processor is to further initiate the media stream with the target device. Alternatively, or in addition, the processor is to further render the media stream without displaying video on the host device in response to receiving the control data or the rebroadcasted control data. Alternatively, or in addition, the control data comprises control commands of a video game or an application. Alternatively, or in addition, the processor is to further determine a channel to use for the accessory connection based on latency.

Example 5

This example provides for an example apparatus for wireless control. The example apparatus includes a processor; and a computer-readable memory storage device storing executable instructions that can be executed by the processor to cause the processor to detect a beacon from a target device. The example apparatus also includes executable instructions that can be executed by the processor to cause the processor to send a connection request to the target device. The example apparatus also includes executable instructions that can be executed by the processor to cause the processor to monitor for a beacon from a host device. The example apparatus also includes executable instructions that can be executed by the processor to cause the processor to establish a direct accessory connection with the host device in response to detecting the beacon from the host device. The example apparatus also includes executable instructions that can be executed by the processor to cause the processor to send control data to the host device via the direct accessory connection. Alternatively, or in addition, the processor is to further send system data via an accessory connection to the target device and control data to the host device via the direct connection if the beacon from the host device is detected. Alternatively, or in addition, the processor is to further send control data and system data via an accessory connection to the target device if the beacon from the host device is not detected within a predetermined period of time. Alternatively, or in addition, the processor is to further associate a button press on a wireless controller with the system data. Alternatively, or in addition, the processor is to further determine wireless channels for the accessory connections based on latency.

Example 6

This example provides for an example method for wireless control. The example method includes detecting, via a processor, a beacon from a target device. The example method also includes sending, via the processor, a connection request to the target device. The example method also includes monitoring, via the processor, for a beacon from a host device. The example method also includes establishing, via the processor, a direct accessory connection with the host device in response to detecting the beacon from the host device. The example method also includes sending, via the processor, control data to the host device via the direct accessory connection. Alternatively, or in addition, the example method can further include sending, via the processor, system data via an accessory connection to the target device and control data to the host device via the direct connection if the beacon from the host device is detected. Alternatively, or in addition, example method can further include sending, via the processor, control data and system data via an accessory connection to the target device if the beacon from the host device is not detected within a predetermined period of time. Alternatively, or in addition, the example method can further include associating, via the processor, a button press on a wireless controller with the system data. Alternatively, or in addition, the example method can further include determining, via the processor, wireless channels for the accessory connections based on latency.

Example 7

This example provides for an example system for wireless control. The example system includes means for receiving a connection request from a wireless controller. The example system also includes means for sending a request for a media stream and a request for a wireless monitoring acknowledgement to a host device. The example system also includes means for receiving a response from the host device with the wireless monitoring acknowledgment. The example system also includes means for receiving a message from the host device acknowledging a reception with the wireless controller. The example system also includes means for stopping monitoring for control data from the wireless controller in response to the host device acknowledging the reception with the wireless controller. The example system also includes means for receiving the media stream from the host device. Alternatively, or in addition, the example system can include means for rendering the media stream based on control data received by the host device from the wireless controller via a direct accessory connection. Alternatively, or in addition, the example system can include means for rebroadcasting control data from the wireless controller via a distinct logical controller to the host device in response to receiving the message acknowledging the lack of reception with the wireless controller. Alternatively, or in addition, the example system can include means for receiving a second message from the host device acknowledging a reception or a lack of reception with the distinct logical controller. Alternatively, or in addition, the example system can include means for receiving the media stream from the host device in response to receiving the second message acknowledging the reception with the distinct logical controller. Alternatively, or in addition, the example system can include means for rebroadcasting the control data from the wireless controller via a wireless local area network connection to the host device in response to receiving the second message acknowledging the lack of reception with the distinct logical controller. Alternatively, or in addition, the example system can include means for receiving the media stream from the host device. Alternatively, or in addition, the wireless monitoring acknowledgement indicates a direct wireless connection between the host device and the wireless controller. Alternatively, or in addition, the example system can include means for receiving a system command from the wireless controller, the system command comprising instructions to be displayed.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A wireless controller, comprising:
    a processor and memory storing instructions to cause the processor to:
    establish a first direct wireless connection with a target device;
    establish a second direct wireless connection with a host device while maintaining the first direct wireless connection; and
    send, in response to detecting that the host device is responding via the second direct wireless connection, system data via the first direct wireless connection to the target device and control data to the host device via the second direct wireless connection.

2. The wireless controller of claim 1, wherein the processor is to send, in response to detecting that the host device is not responding via the second direct wireless connection, both the control data and the system data to the target device via the first direct wireless connection, the control data to be rebroadcasted to the host device via a third direct wireless connection or a wireless local area connection and the system data to be processed by the target device.

3. The wireless controller of claim 1, wherein the processor is to detect a beacon from the target device and send a connection request to the target device.

4. The wireless controller of claim 1, wherein the processor is to monitor for a beacon from the host device.

5. The wireless controller of claim 1, wherein the system data is to be used by the target device to control a user interface on the target device.

6. The wireless controller of claim 1, wherein the wireless controller comprises one or more buttons associated with the system data, the system data to be generated by pressing one or more of the buttons.

7. The wireless controller of claim 1, wherein the control data is to be used to render a media stream on the host device.

8. The wireless controller of claim 1, wherein the wireless controller is to select the second direct wireless connection to send the control data based on latency, reliability, or both.

9. A method for wireless control, comprising:
    establishing, at a wireless controller, a first direct wireless connection with a target device;
    establishing, at the wireless controller, a second direct wireless connection with a host device while maintaining the first direct wireless connection; and
    sending, in response to detecting that the host device is responding via the second direct wireless connection, system data via the first direct wireless connection to the target device and control data to the host device via the second direct wireless connection.

10. The method of claim 9, comprising sending, in response to detecting that the host device is not responding via the second direct wireless connection, both control data and system data to the target device via the first direct wireless connection, the control data to be rebroadcasted to the host device via a third direct wireless connection or a wireless local area connection and the system data to be processed by the target device.

11. The method of claim 9, comprising detecting, at the wireless controller, a beacon from the target device and send a connection request to the target device.

12. The method of claim 9, comprising monitoring, via the wireless controller, for a beacon from the host device.

13. The method of claim 9, wherein the system data is to be used by the target device to control a user interface on the target device.

14. The method of claim 9, wherein the control data is to be used to render a media stream on the host device.

15. The method of claim 9, comprising selecting, via the wireless controller, the second direct wireless connection to send the control data based on latency, reliability, or both.

16. One or more computer-readable memory storage devices for storing computer readable instructions that, when executed by one or more processing devices, instruct wireless control of devices, the computer-readable instructions comprising code to:
- establish a first direct wireless connection with a target device;
- establish a second direct wireless connection with a host device while maintaining the first direct wireless connection; and
- send, in response to detecting that the host device is responding via the second direct wireless connection, system data via the first direct wireless connection to the target device and control data to the host device via the second direct wireless connection.

17. The one or more computer-readable memory storage devices of claim 16, the computer-readable instructions comprising code to send, in response to detecting that the host device is not responding via the second direct wireless connection, both control data and system data to the target device via the first direct wireless connection, the control data to be rebroadcasted to the host device via a third direct wireless connection or a wireless local area connection and the system data to be processed by the target device.

18. The one or more computer-readable memory storage devices of claim 16, the computer-readable instructions comprising code to detect a beacon from the target device and send a connection request to the target device.

19. The one or more computer-readable memory storage devices of claim 16, the computer-readable instructions comprising code to monitor for a beacon from the host device.

20. The one or more computer-readable memory storage devices of claim 16, the computer-readable instructions comprising code to control a user interface on the target device based on the system data.

* * * * *